P. W. FLEISCHER.
FISH CUTTING AND EVISCERATING MACHINE.
APPLICATION FILED AUG. 17, 1916.

1,262,319.

Patented Apr. 9, 1918.
6 SHEETS—SHEET 1.

Fig. 1.

WITNESS
Marshall Low

INVENTOR
Paul W. Fleischer,
BY
H N Low
ATTORNEY

P. W. FLEISCHER.
FISH CUTTING AND EVISCERATING MACHINE.
APPLICATION FILED AUG. 17, 1916.

1,262,319.

Patented Apr. 9, 1918.
6 SHEETS—SHEET 2.

Fig. 2.

WITNESS
Marshall Low

INVENTOR
Paul W. Fleischer,
BY
H. N. Low
ATTORNEY

P. W. FLEISCHER.
FISH CUTTING AND EVISCERATING MACHINE.
APPLICATION FILED AUG. 17, 1916.

1,262,319.

Patented Apr. 9, 1918.
6 SHEETS—SHEET 3.

WITNESS
Marshall Low

INVENTOR
Paul W. Fleischer,
BY
N N Low
ATTORNEY

P. W. FLEISCHER.
FISH CUTTING AND EVISCERATING MACHINE.
APPLICATION FILED AUG. 17, 1916.

1,262,319.

Patented Apr. 9, 1918.
6 SHEETS—SHEET 5.

Fig. 5.

WITNESS
Marshall Low

INVENTOR
Paul W. Fleischer,
BY
H N Low
ATTORNEY

UNITED STATES PATENT OFFICE.

PAUL W. FLEISCHER, OF NEW YORK, N. Y., ASSIGNOR TO AMERICAN CAN COMPANY, A CORPORATION OF NEW JERSEY.

FISH CUTTING AND EVISCERATING MACHINE.

1,262,319.   Specification of Letters Patent.   Patented Apr. 9, 1918.

Application filed August 17, 1916.  Serial No. 115,478.

*To all whom it may concern:*

Be it known that I, PAUL W. FLEISCHER, a citizen of the United States, residing at New York, in the county of New York and State of New York, have invented certain new and useful Improvements in Fish Cutting and Eviscerating Machines, of which the following is a specification.

The invention relates to a mechanism by which the fish are positioned, cut and eviscerated without any necessary handling of the fish individually. The machine is or may be thus automatic in all of the above operations, but it will be understood that the eviscerating means may be employed with any preferred manner of positioning and cutting the fish.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Referring to the drawings, the fish positioning and cutting means are or may be substantially similar to those set forth in the application of William F. Butler, Serial No. 74,629, filed Jan. 27, 1916. 1 is a chute typical of any fish delivering means, and by which the fish may arrive from the separators which have approximately graded them according to size. This chute delivers into a hopper 2 which may have vertical sides and a front inclined wall 3, its rear wall being formed by the upwardly movable limb of an elevating conveyer 4. This shape of the hopper may begin to cause the transverse positioning of the fish but is not essential to the final result. The conveyer 4 comprises transverse slats or flights 5, preferably of the shape shown so that each forms a shelf for receiving one or more fish in the hopper 2 and carrying them up and over the top turn of the conveyer. The flights 5 are attachable to and carried by a belt or chains 6 positioned and driven by pulleys 7 on shafts 8, 9, the top shaft being the driving shaft and actuated by a pulley 1', belt 2' and pulley 3'. As the fish fall from the conveyer 4 they fall in positions parallel with each other and transverse to the line of advance and some with their heads pointing to the right and others with their heads pointing oppositely, as may happen, on the surface of a rearwardly inclined chute 10. This chute has such suitable inclination as causes the fish to slide downwardly and rearwardly into a constantly revolving drum 11. The friction of the fish on the top surface of the chute 10 causes them all to turn with their heads downward and rearward, so that each fish enters the drum 11 head first. This turning of the fish may be said to be due either to the retarding of their tails or the greater weight of the head portions or to the resistance of the fins and scales against allowing the fish to slide tail first, but perhaps more or less to all of these causes. It will be understood that a stream of water may be caused to flow down the chute 10, which may be employed in case the chute has not a steep inclination. A waterpipe for this purpose is indicated at 12 (Fig. 2), but this is not an essential part of the apparatus and is to be employed only in case it be desired to facilitate the movement of the fish which may not be wet enough. The chute 10 may be provided with a bottom surface of mesh wire to give a little resistance to the sliding of the fish and aid in compelling them to turn as above mentioned.

14 is a frame having a rearwardly inclined top on which are fixed bearings 15 in which are journaled, one at each side of the frame, downwardly and rearwardly inclined shafts 16, 16'. On the ends of these shafts are fixed or mounted rollers 17 on which the drum is mounted in its inclined position. The drum is shown as formed with a cylindrical corrugated wall 18 riveted or suitably attached to external rings 20 and 21. The ring 20 is provided at its upper end with a peripheral flange 22 which engages against the upper sides of the said rollers 17 and holds the drum from sliding downward.

Figure 1:
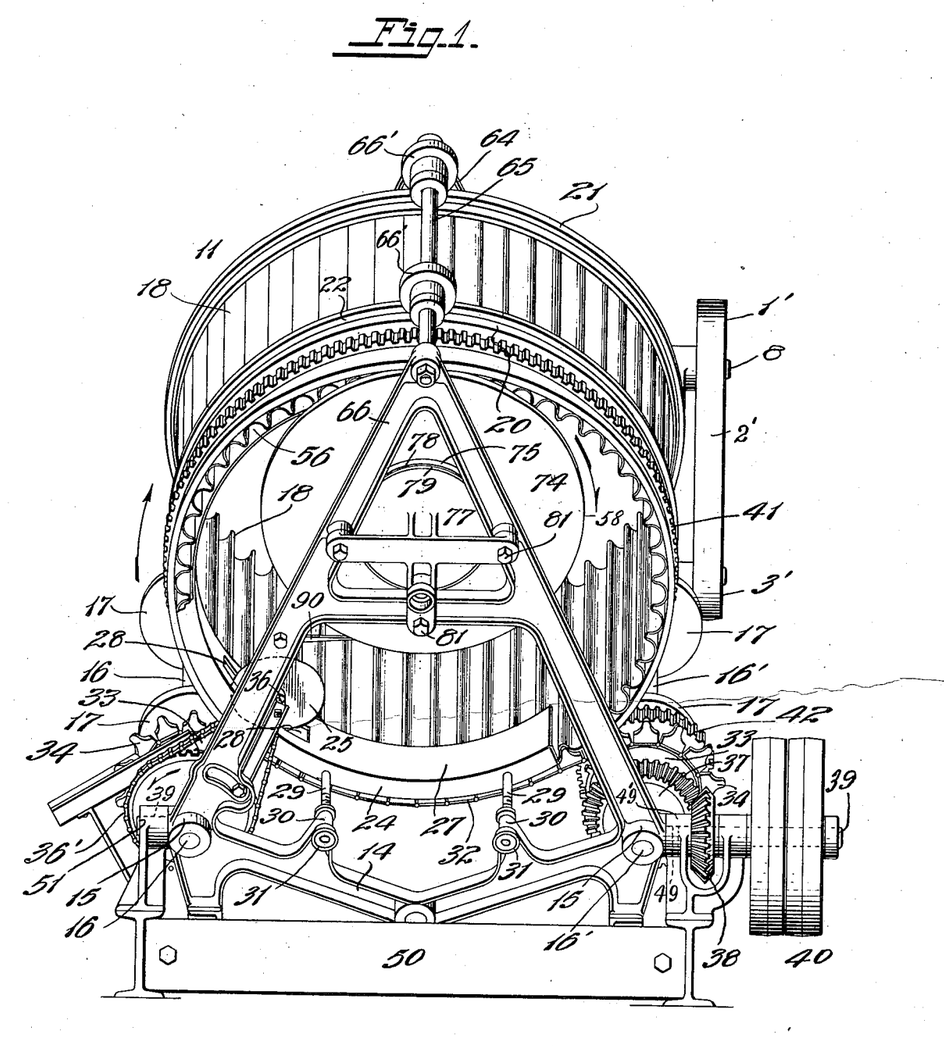
Figure 1 is a rear elevation of the machine.

The longitudinal flanges of the rings serve as tracks which run upon the said rollers as the drum is revolved. Each of the corrugations of the drum wall 18 is of sufficient size to receive one or more fish as they leave the chute 10. It will be understood that the corrugations pass successively across the paths of the fish and the number of fish received in each corrugation may be varied according to different conditions, such as the size of the fish and the frequency with which they are fed from the elevating conveyer as compared with the speed of rotation of the drum; it being desirable not to have more fish in any corrugation than the same is wide enough to conveniently hold, which result can be attained by suitably regulating the speeds of the said parts. The interior and lower part of the drum may be sprinkled with water from pipe 12 to make it slippery so as to facilitate the downward sliding of the fish therein along the said corrugations. The fish quickly arrive at the lower end of the drum and they are stopped uniformly by a gage 24 (Fig. 1). When so stopped their heads project a little beyond the lower end of the drum and the rear line of their gills is substantially in line with a rotary cutter or knife 25 against the edge of which the fish are successively carried by the rotation of the drum, so that their heads will all be cut off at the desired point. While the fish are thus at the lower end of the drum and approaching the cutter they are confined by a plate 27 which is attached to the gage 24 and extends within the drum a little past the cutting point, being provided with a space 28 in which the cutter works, and which is wide enough for the adjustment of the gage longitudinally of the drum, as may be required to adapt the machine for operation on fish of different sizes. It will be understood that the gage 24 is fixed and does not partake of the rotation of the drum, being carried at the inner ends of adjusting screws 29 which work in fixed bearings 30 and are provided with adjusting handles 31. The bearings 30 are supported from the frame 14.

32 indicates an endless chain which is mounted on sprockets 33 fixed on the shafts 16, 16', and which travels with the same speed as the drum, the sprockets and rollers 17 being of substantially the same diameter. This chain is provided with flights 34 which are spaced apart to correspond substantially with the corrugations of the drum, so that a fish sliding down a corrugation will enter with its head between the said flights 34. The chain 32 is arranged just beyond the lower end of the drum and forms a support for the heads of the fish, and a means for carrying the heads against the cutter and a means for discharging the cut-off head separately from the body at a point beyond the cutter. The upper limb of the endless chain is caused to conform to the drum by the engagement of the upper edges of the flights 34 with the under surface of the gage 24 (Fig. 1), the gage conforming with the drum.

The cutter 25 is fixed on a shaft 36 which is suitably and adjustably supported from the frame 14. Shafts 16 and 36 are operatively connected by a chain 36'. The shaft 16' has fixed thereon a beveled pinion 37 which meshes with a similar pinion 38 on a transverse shaft 39, to which latter power is applied at will to operate the described mechanism by fast and loose pulleys 40 on the shaft.

It is preferred to give the drum a positive rotation, which may be done by providing the shaft 16' with a gear 42 which meshes with teeth 41 on the ring 20.

The said chain may be dispensed with and the drum correspondingly extended downward so as to support and carry the heads of the fish.

The corrugated drum is typical of any equivalent inclined and movable surface having means for holding the fish alined side by side, parallel with each other, with their heads in the same direction, and such a surface or carrier may be of various forms and arrangements without departing from the invention.

The positioning of the fish for cutting also serves to position them suitably for the action of an eviscerating device, the same to operate in immediate succession to the cutter.

The elevator 4 has or may have its flights 5 of such width and length that each will pick up and carry one fish, and the moving corrugated surface may be correspondingly timed so that one fish will occupy each corrugation against the gage 24. This is more important for eviscerating than for merely cutting.

43 is a brush mounted on a shaft 44 journaled in arms 45 pivoted at 46 to the frame of the elevator 4 and adjustable toward or from the elevating limb thereof by links 47. This brush serves to push the fish, ordinarily one fish on each of the flights 5, securely on to the elevator. The brush may be turned by the contact and passage of the elevating limb, but I prefer to rotate it in the direction shown by the arrow by a belt 48 run by a pulley on the shaft 8.

Figure 2:
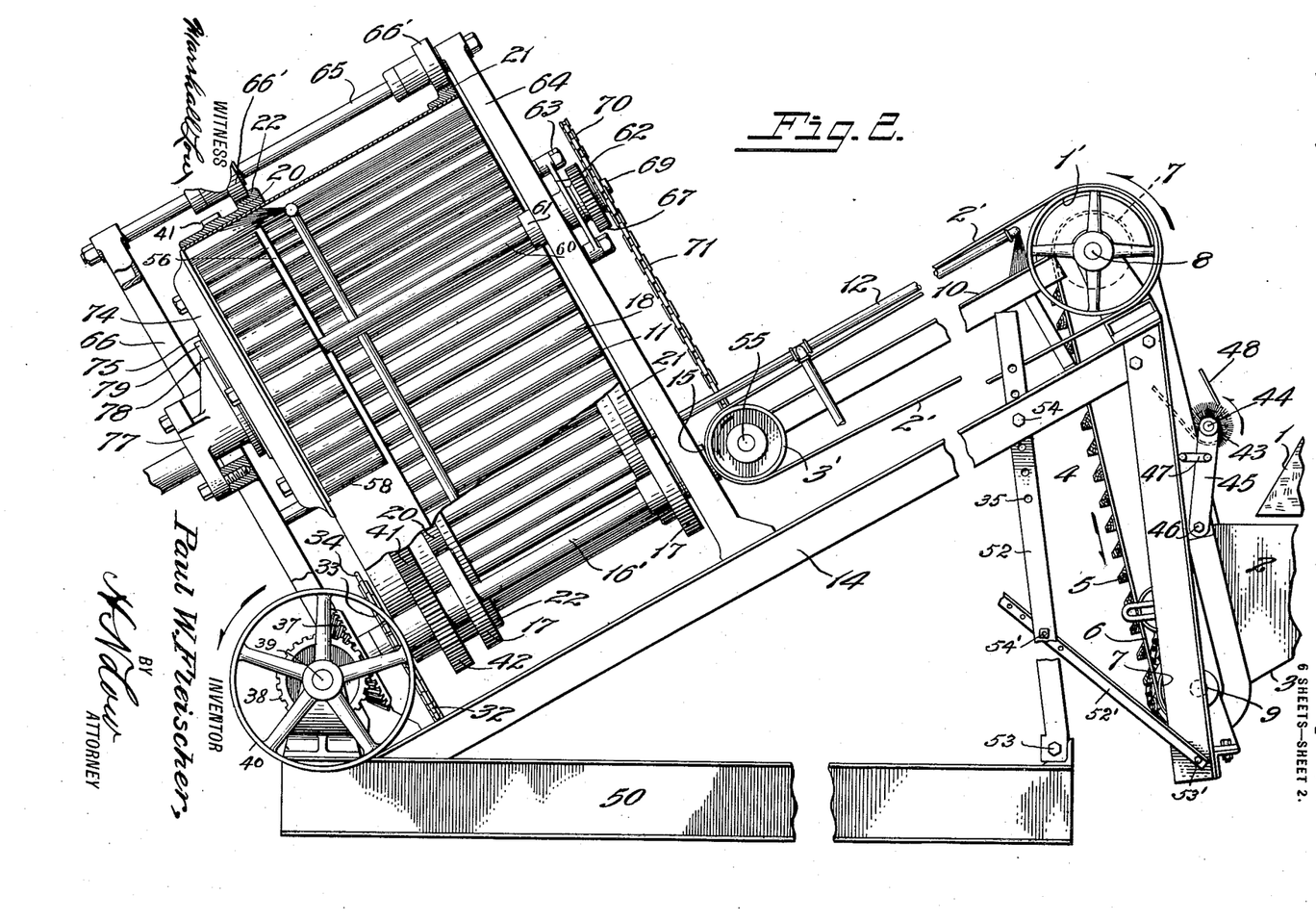
Fig. 2 is a side view partly in section.
Figure 3:
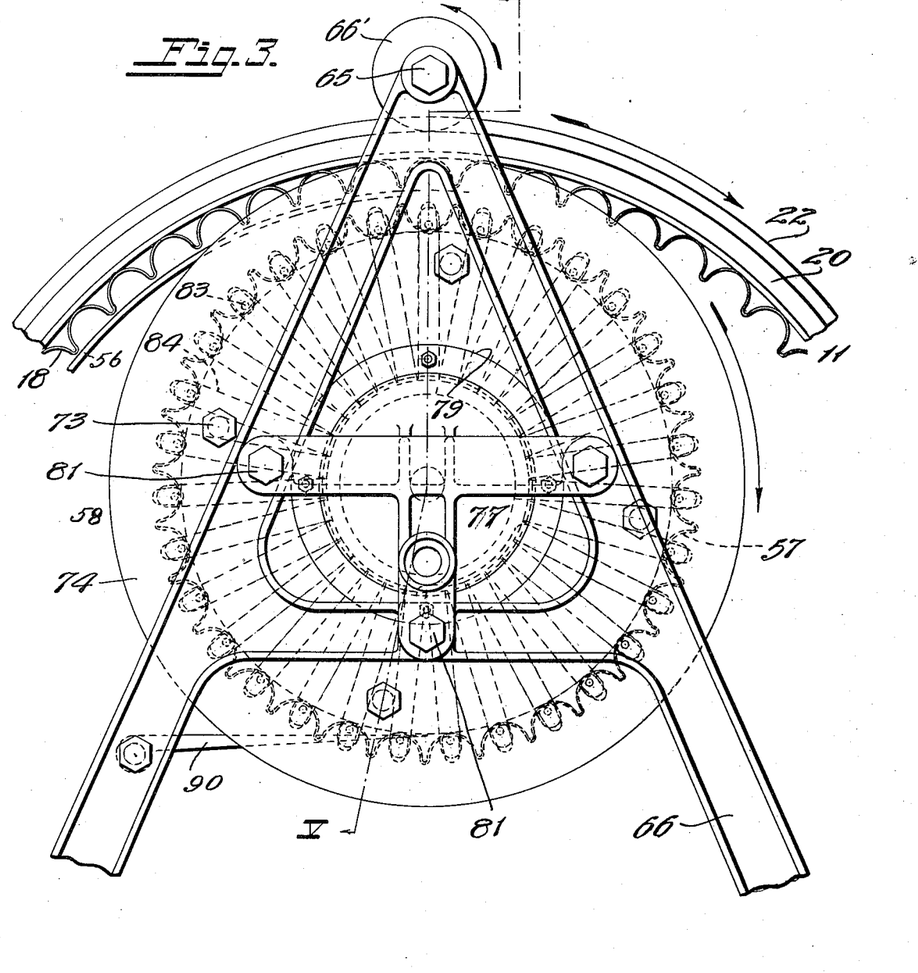
Fig. 3 is a rear elevation on a larger scale of the eviscerating means.

It is preferred to have the chute and drum adjustable as to their inclination so as to get the proper speed and regularity of delivery of the fish into the drum and against the gage 24 for the rapid operation of the machine, and such inclination may vary with the size and slipperiness of the fish being handled, or other conditions. At its rear part the frame 14 is provided with transverse trunnions 49, one of which enters into the inner end of the fixed bearing 49' which is attached to the horizontal base 50 of the machine and the outer part of which bearing carries the said shaft 39. The other trunnion turns in a bearing 51 attached to the other side of the base 50. The frame 14 is braced at the desired inclination, which it is capable of assuming by struts 52 pivoted at 53 to said base and having a series of perforations 35 by any of which the struts may be secured to the frame 14 with the aid of bolts 54 (Fig. 2). The lower part of the elevator is or may be supported by braces 52' which are pivoted at 53' to the lower part of the elevator and are adjustably connected with the struts 52 by bolts 54'.

The shaft 16' is connected by bevel gearing 26 with the shaft 55 of the pulley 3' (Figs. 2 and 7) whereby the elevator 4 is operated in proper time with the drum for the distribution of the fish in the corrugations of the wall 18.

The foregoing description and accompanying illustration sets forth a practical means for supplying cut fish for the eviscerating means, but it is to be understood that the latter is in a sense independent of said supplying means and may be arranged to be supplied with fish by hand, or by suitable automatic mechanism other than that shown.

After the fish have been decapitated their bodies are carried onward and upward by the drum 11, being confined in the corrugations thereof by a flanged plate 56, or its equivalent, which is or may be an extension of the plate 27 held in fixed position therewith, these plates being concentric with the interior of the drum. Or the plate 56 may be independent of the plate 27. If the plates 27 and 56 are secured or made together the gage 24 should be adjustable relative to the plate 27.

Figures 4, 7:
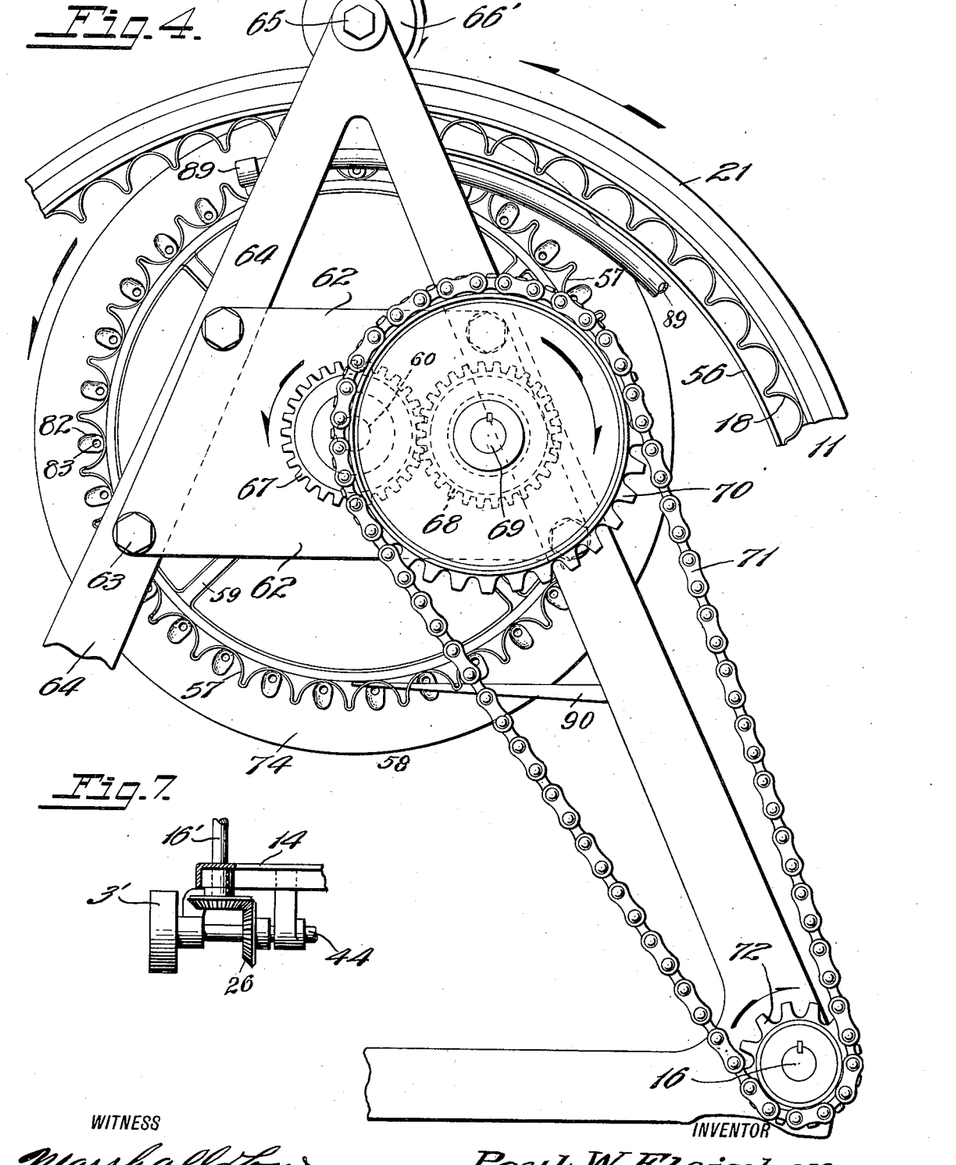
Fig. 4 is a front view of the same.
Fig. 7 is a detail and top plan view illustrating the gearing for actuating the elevating conveyer.

As the fish, one after another, arrive at or near the top of the drum 11 (Fig. 5) they drop successively off the edge of the plate 56 into recesses or concave corrugations 57 of the eviscerating carrier or drum 58. This drum comprises preferably a rotary spider or disk 59 which is fixed on an actuating shaft 60 supported at the front of the drum 11 in a bearing 61 formed with a plate 62. This plate is bolted at 63 to a frame 64 attached at its base to and forming a part of the frame 14 and connected at its upper end by a rod 65 with a somewhat similar frame 66 also forming a part of the frame 14 at the rear of the drum 11. The rod 65 carries front and rear top bearing rollers 66' running on the rings 20, 21 of the drum 11 to confine and steady the latter and hold the rack teeth 41 in mesh with the gear 42. The shaft 60 is rotated in time with the drum 11 by a pinion 67, and this in turn by a gear 68 fixed on a short shaft 69. Fixed on the latter is a sprocket wheel 70 geared by a chain 71 with a pinion 72 on the shaft 16 (Fig. 4).

Figure 5:
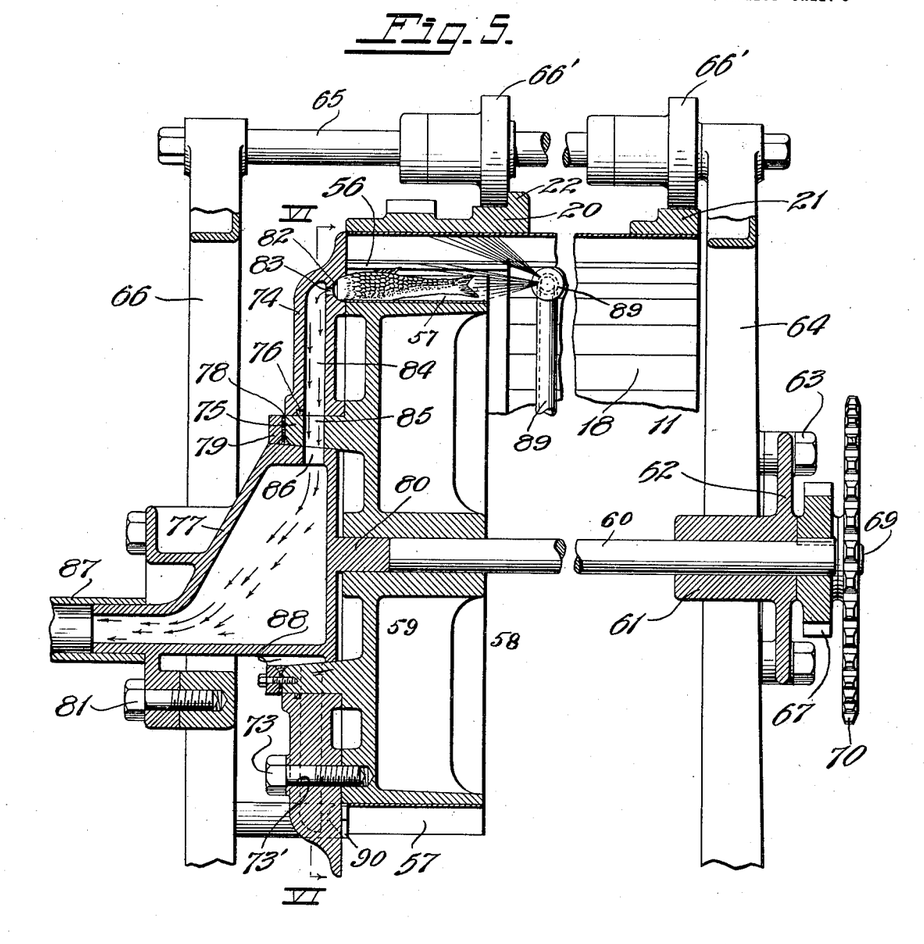
Fig. 5 is a vertical longitudinal section of the same on line V—V of Fig. 3.
Figure 6:
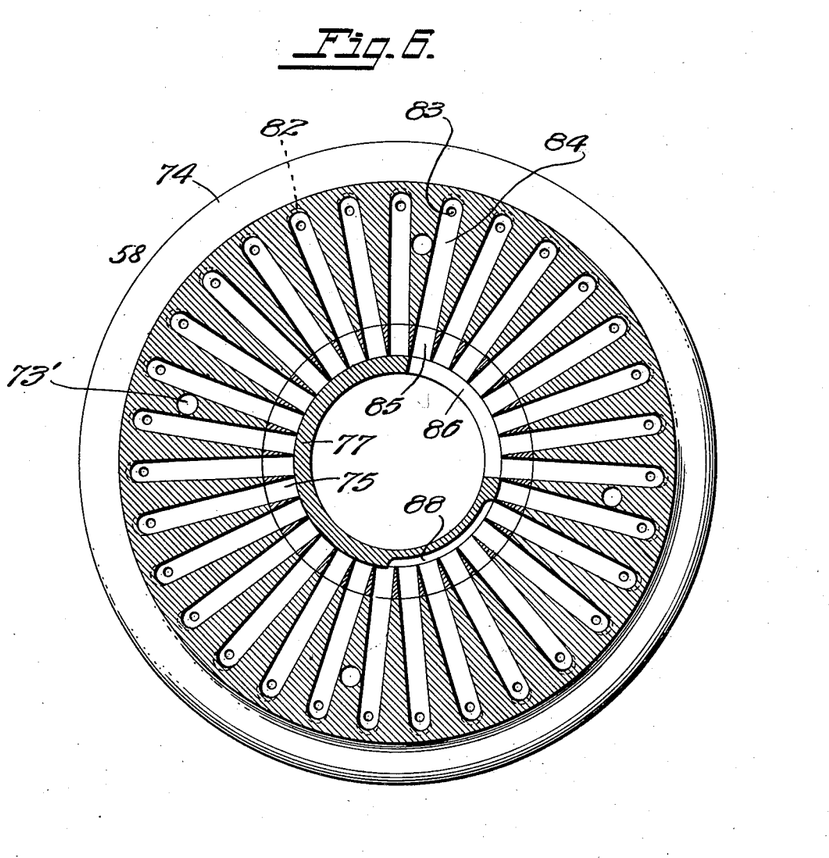
Fig. 6 is a cross section on line VI—VI of Fig. 5.

The disk 59 has attached thereto a peripheral wall, which may be of sheet metal, and which is corrugated or otherwise formed to produce the said recesses 57, and also has attached thereto, as by bolts 73 passing through holes 73', a head or rear end plate 74. The disk 59 is preferably cast with a rear flange 75 concentric on its interior with the axis of the disk, and the head 74 is or may be fitted around said flange, the joint being made air tight by a packing 76. The inner face of the flange 75 is made flaring and fits around and turns on the correspondingly shaped exterior of the fixed viscera receiver 77, the joint being made air tight by a packing 78 confined by a ring 79. 80 is a bearing stud cast with the receiver 77 and entering the rear part of the axial bearing of the disk 59 to give rotary support to the same, the receiver being bolted to the frame 66 at 81. At the inner end of each recess 57 is a rounded or tapering socket 82, formed in the head 74, into which the decapitated end of the fish may be sucked by air suction (Fig. 5). Leading from said socket is an aperture 83 for the passage of viscera, from within the body of the fish into a radial passage 84, also formed in the head 74 and communicating with a passage 85 through the flange 75 and a passage 86 through the wall of the receiver 77. It will be understood that each fish-receiving recess 57 has a passage 83, 84, 85 (Fig. 6), and that the passage 86 is of suitable peripheral length so that each fish may be sufficiently subjected to eviscerating suction, for instance, from the time that it drops into its recess 57 until it has passed down to about the side of the drum 58.

87 is an air pipe or hose (Fig. 5) leading from the rear end of the receiver 77 to any suitable air-exhausting pump or apparatus (not shown) by means of which a strong suction is caused within the said receiver, passages and apertures 83, to draw the decapitated end of the fish tightly into the socket 82, where it is caused by atmospheric pressure to make an air tight fit, and to cause the viscera to be drawn from the fish and take the course indicated by the arrows (Fig. 5) to the pipe 87, the body of the fish being at the same time pressed in and collapsed by atmospheric pressure.

It will be seen (Fig. 6) that the wall of the receiver 77 cuts off from the exhausting apparatus all of the apertures 83 excepting those whose recesses 57 have received fish as above described. As soon as any recess 57 has received a fish, at the top of the drum 58, its passage 85 moves over the passage 86 and the said suction and eviscerating process begins, and continues until the moving passage 85 reaches and is cut off by the wall of the receiver at the other end of the fixed passage 86. The eviscerating being then accomplished the partial vacuum in such passage 84, 85 is relieved by an open air port 88. This port 88 is reached when the fish-holding recess 57 is inclined downward, at the right hand lower part of the drum 58 in Fig. 6, and the fish is thereby released and allowed to drop by gravity into a receiver or chute of any suitable character arranged below such point of release at the open end of the drum 11.

I may employ a water spray pipe 89 within the upper part of the drum 11 to wash the fish after decapitation and while they are on the drum 58. The water of such spray may act to force the fish to the sockets 82 and to promote their water tight engagement therein, and the water tight fit of the parts of the eviscerating drum and receiver. The pipe 89 is or may be a branch of the pipe 12.

90 is a detaching means for separating or ejecting the eviscerated fish from the suction devices or orifices and sockets 83, 82, shown in this instance as a finger fixed to the frame and having its end on or near the disk 59 at the inner ends of the corrugations 57, so that the fish are carried along below the said finger and are separated thereby from the eviscerating drum in case they should stick in the suction sockets; but the fish will ordinarily fall away by gravity.

What is claimed is:

1. In an eviscerating machine, in combination: traveling fish-holding and cutting means, suction and eviscerating means having fish-engaging portions which move for a distance with and constantly return relative to said fish holding means, and operating means for actuating said elements.

2. In an eviscerating machine, in combination: rotary holding and cutting means, suction and eviscerating means having fish-engaging portions which move for a distance with and constantly return relative to said fish holding means, and operating means for actuating said elements.

3. In an eviscerating machine, in combination: rotary holding and cutting means, rotary suction and eviscerating means having fish-engaging portions which move for a distance with and constantly return relative to said fish holding means, and operating means for actuating said elements.

4. In an eviscerating machine, in combination: a rotary holding drum, decapitating cutters coöperating therewith, a suction and eviscerating drum which moves for a distance with and constantly returns relative to said fish holding drum, and operating means for actuating said elements.

5. In an eviscerating machine, in combination: an inclined rotary fish holding drum, decapitating cutters coöperating therewith, an inclined suction and eviscerating drum which moves for a distance with and constantly returns relative to said fish holding drum, and operating means for actuating said elements.

6. In an eviscerating machine, in combination: traveling suction means, fish-holding and cutting means which move for a distance with and constantly return relative to said suction means, and operating means for actuating said elements.

7. In an eviscerating machine, in combination: an inclined rotary suction and eviscerating drum having fish holding means which move for a distance in communication with air exhausting means, said air exhausting means, and operating mechanism for actuating said elements.

8. In an eviscerating machine, in combination: rotary fish-holding and cutting means, rotary suction means, and mechanism connected with said elements for causing them to turn in unison while said suction means is in operation.

9. In an eviscerating machine, in combination: inclined rotary fish holding and cutting means, inclined rotary suction means, and mechanism connected with said elements for causing them to turn in unison while said suction means is in operation.

10. In an eviscerating machine, in combination: an inclined rotary fish holding drum, decapitating cutters coöperating therewith, a rotary inclined suction drum, and mechanism connected with said elements for causing them to turn in unison while the suction is in operation.

11. In an eviscerating machine, in combination: fish-holding means, suction and eviscerating means, and mechanism for giving prolonged action of the suction and eviscerating means on the fish held by said holding means.

12. In an eviscerating machine, in combination: fish holding means, suction and eviscerating means, mechanism for giving prolonged action of the suction and eviscerating means on the fish held by said holding means, and means for opening and cutting off the conduit of the suction means.

13. In an eviscerating machine, in combination: fish-holding and conveying means, suction and eviscerating means, mechanism for giving prolonged action of the suction and eviscerating means on the fish held by said holding means, means for opening the conduit of the suction means when the fish have reached a predetermined point in their conveyance, and means for cutting off said conduit at a later time.

14. In an eviscerating machine, in combination: fish-holding means, including a rotary drum, suction and eviscerating means, and mechanism operated by said drum for giving prolonged action of the suction and eviscerating means on the fish held by said holding means.

15. In an eviscerating machine, in combination: movable holding means for the bodies to be eviscerated, movable suction means for operating on said bodies, and mechanism for causing the said bodies and said suction means to travel in unison while the said suction means are in operation.

16. In an eviscerating machine, in combination: movable holding and cutting means for the bodies to be eviscerated, movable suction means for operating on said bodies, and mechanism for causing the said bodies and said suction means to travel in unison while the said suction means is in operation.

17. In an eviscerating machine, in combination: an inclined rotary drum having holding and cutting means for the bodies to be eviscerated, an inclined drum having suction means for operating on said bodies, and mechanism for causing the said drums to travel in unison while the said suction means is in operation.

18. In an eviscerating machine, in combination: an inclined rotary drum having cutting and holding means for the bodies to be eviscerated, an inclined rotary drum within the first drum and having suction means for operating on said bodies, and mechanism for causing the fish and said suction means to travel in unison while the said suction means is in operation.

19. In an eviscerating machine, in combination: an automatic fish-positioning means including an inclined rotary drum into which the fish are entered, decapitating cutters, an inclined fish-holding and suction drum within the first drum and having suction means for operating on said decapitated fish, and mechanism for causing the suction to be opened and to be cut off at different points in the conveyance of the fish.

20. In an eviscerating machine, in combination: means for cutting the bodies to be eviscerated to obtain access to the interior of the same, suction means for withdrawing the viscera, mechanism for holding and presenting the fish successively to said suction means, and means for causing the suction means to travel with the fish holding mechanism during the action of the suction means.

21. In an eviscerating machine, in combination: means for decapitating the bodies to be eviscerated, suction means for withdrawing the viscera having an elongated passage and a rotary drum for holding and placing the fish successively in communication with said elongated passage.

22. In an eviscerating machine, in combination: a movable fish-holding means, and a suction means having an elongated suction passage, and mechanism for causing the fish holding means to travel along said elongated passage, whereby the suction and eviscerating action on the fish are prolonged.

23. In an eviscerating machine, in combination: an inclined rotary fish holding drum, and a suction means having an elongated suction passage, and mechanism for causing the said drum to travel along said elongated passage, whereby the suction and eviscerating action on the fish are prolonged.

24. In an eviscerating machine, in combination: a rotary fish-holding drum having fish holding recesses and passages leading therefrom, a suction means having an elongated suction passage, and mechanism for causing the said drum to travel along said elongated passage, with the said passages of the drum in successive communication with said elongated passage.

25. In an eviscerating machine, in combination: a movable fish-holding means, a suction means, an elongated suction passage by which said suction means and fish-holding means communicate, and mechanism for causing the fish holding means to travel relative to said suction means, whereby the suction and eviscerating action on the fish are prolonged.

26. The combination of a slide, a surface inclined downward and provided with means for holding fish gaged side by side parallel with each other with their heads downward in the same direction, to which surface the fish are delivered head foremost by said slide, means for gaging and alining the fish with their heads at the same transverse plane, decapitating cutters for operating on the fish, and suction and eviscerating means to which the fish are delivered from the said inclined surface.

27. The combination of a slide, a rotary drum having an interior inclined surface provided with means for holding the fish gaged side by side parallel with each other with their heads downward in the same direction, to which surface the fish are delivered head foremost by said slide, means for gaging and alining the fish with their heads at the same transverse plane, and suction and eviscerating means to which the fish are delivered from said drum.

28. The combination of an inclined conveying surface having fish holding means, automatic means for delivering fish head downward to said surface, and suction and eviscerating means with which the bodies of the fish are successively placed in communication.

29. The combination of an inclined rotary drum having on its interior means for guiding fish and holding them in alinement; means for gaging the fish in said drum; a decapitating knife against which the gaged fish are carried by the rotation of the drum; automatic means for delivering fish head first into said drum from a miscellaneous collection of fish, and suction and eviscerating means with which the decapitated fish are successively placed in communication.

30. A method for eviscerating fish, which consists in exposing the viscera to suction action, conveying the fish continuously, and subjecting the fish to prolonged eviscerating suction while they are being conveyed.

31. A method for eviscerating fish, which consists in exposing the viscera to suction action, conveying the fish continuously, and subjecting the fish to continuous eviscerating suction during such conveyance.

32. A method for eviscerating fish, which consists in decapitating the fish, conveying the fish continuously, and subjecting the fish to continuous eviscerating suction while they are being conveyed.

33. A method for eviscerating fish, which consists in decapitating the fish, conveying the fish continuously around an inclined axis, and subjecting the fish to continuous eviscerating suction during an arc of such conveyance.

34. The combination with the rotary drum having suction means for eviscerating the fish, of means for detaching the eviscerated fish from the suction orifices of the said drum.

In testimony whereof I affix my signature.

PAUL W. FLEISCHER.